(12) United States Patent
Shimizu

(10) Patent No.: US 7,322,702 B2
(45) Date of Patent: Jan. 29, 2008

(54) PROJECTING DISPLAY APPARATUS

(75) Inventor: Hitoshi Shimizu, Saitama (JP)

(73) Assignee: Fujinon Corporation, Saitama (JP)

( * ) Notice: Subject to any disclaimer, the term of this patent is extended or adjusted under 35 U.S.C. 154(b) by 230 days.

(21) Appl. No.: 11/145,929

(22) Filed: Jun. 7, 2005

(65) Prior Publication Data

US 2005/0280779 A1    Dec. 22, 2005

(51) Int. Cl.
*G03B 21/14* (2006.01)
(52) U.S. Cl. ......................................... 353/81; 348/771
(58) Field of Classification Search .................. 353/98, 353/99, 81, 33; 348/742, 743, 77
See application file for complete search history.

(56) References Cited

U.S. PATENT DOCUMENTS

| | | | |
|---|---|---|---|
| 6,491,398 B2 * | 12/2002 | Takeuchi et al. | 353/31 |
| 6,726,332 B2 * | 4/2004 | Cannon et al. | 353/33 |
| 6,840,631 B2 * | 1/2005 | Sawamura et al. | 353/81 |
| 7,077,528 B1 * | 7/2006 | Bowron et al. | 353/78 |
| 7,128,425 B2 * | 10/2006 | Kumai | 353/119 |

FOREIGN PATENT DOCUMENTS

| | | |
|---|---|---|
| JP | 2002-6257 | 1/2002 |
| JP | 2003-262918 | 9/2003 |

* cited by examiner

*Primary Examiner*—William C. Dowling
(74) *Attorney, Agent, or Firm*—Young & Thompson

(57) ABSTRACT

A projector engine is provided with an illuminating optical system having an optical axis in parallel with a horizontal direction of a screen and a projecting optical system having an optical axis perpendicular to the optical axis. A first mirror, a total reflection prism and DMD are provided between the illuminating optical system and the projecting optical system. The total reflection prism guides illuminating light incident from the illuminating optical system to DMD and totally reflects image light emitted from DMD to emit to the projecting optical system. DMD is inclined by 45 degrees to the horizontal direction of the screen along with a circuit board and is rotated by 45 degrees centering on a direction of a normal line of DMD.

9 Claims, 7 Drawing Sheets

PROJECTING DISPLAY APPARATUS

This application is based on Japanese Patent application JP 2004-168078, filed Jun. 7, 2004, the entire content of which is hereby incorporated by reference. This claim for priority benefit is being filed concurrently with the filing of this application.

BACKGROUND OF THE INVENTION

1. Technical Field of the Invention

The present invention relates to a projecting display apparatus for projecting an image of an image display panel onto a screen.

2. Background of the Invention

A rear projection display is provided with a cabinet having a screen, a plane mirror provided to incline to a rear side of the screen, and a projector engine for emitting image light to the plane mirror and an image projected to the rear side of the screen is enjoyed from a front side thereof. The projector engine is provided with an illuminating optical system for producing illuminating light having a uniform illuminance from a white color light source having a high brightness, an image display panel for modulating the illuminating light into image light, a projecting optical system for enlarging the image light to focus on the screen. According to a rear projection display of a spreading type, as the image display panel, the main stream is constituted by a three plate type using three sheets of liquid crystal panels of LCOS or the like and a single plate type using one sheet of a digital micromirror device (DMD).

According to the projecting display apparatus of the single plate type having DMD constituting the image display panel of a reflection type, a total reflection prism (TIR prism) is provided between the illuminating optical system and the projecting optical system. The total reflection prism is used as means for splitting a light path of illuminating light and a light path of image light by restraining loss of a light amount. The total reflection prism is constituted by, for example, combining two triangular prisms and an air gap is provided between the two triangular prisms in order to promote an efficiency of total reflection operation.

According to a projecting display apparatus described in JP-A-2002-6257, illuminating light emitted from an illuminating optical system is totally reflected to DMD by a total reflection face of a total reflection prism. DMD modulates illuminating light into image light and image light from DMD is incident on a projecting optical system by transmitting the total reflection face. Therefore, the image light transmits through an air gap of the total reflection prism. The lower the parallelism of faces of the two triangular prisms opposed to each other via the air gap, the more produced is the aberration and therefore, it is necessary to make the two faces in parallel with each other with a high accuracy. That is, in the total reflection prism, a high positional accuracy is requested between the two triangular prisms in addition to an accuracy of shapes of the respective triangular prisms.

According to a projecting display apparatus described in JP-A-2003-262918, illuminating light emitted from an illuminating optical system is incident on DMD by transmitting through a total reflection prism. Image light modulated by DMD is totally reflected to a projecting optical system by a total reflection face of the total reflection prism. In this case, image light is not transmitted through an air gap between two triangular prisms and therefore, so far as an accuracy of a shape of a triangular prism (plane accuracy of reflecting face or the like) satisfies constant level, even when a positional accuracy of the two triangular prisms is comparatively low, a grade of a projected image is not deteriorated and time and labor required in fabricating the total reflection prism can be alleviated.

Further, the projecting display apparatus described in JP-A-2003-262918 is provided with the illuminating optical system and the optical projecting system such that optical axes thereof are substantially in parallel with each other and is provided with a circuit board with a control circuit for driving DMD such that a board face thereof becomes substantially in parallel with the optical axes of the respective optical systems. Thereby, the circuit board is restrained from being projected in comparison with the case of arranging the circuit board perpendicularly to the optical axes of the respective optical systems and large-sized formation of the projector engine is prevented.

However, when the illuminating optical system and the projecting optical system are provided such that optical axes thereof become perpendicular to each other to adapt to projection of a rear system different from that described in JP-A-2003-262918, there poses problem that according to a total reflection prism arranged between the illuminating optical system and the projecting optical system, from a necessity of ensuring a critical angle for totally reflecting image light, an incident direction of illuminating light and an emitting direction of image light cannot be made to be perpendicular to each other and it is difficult to arrange the illuminating optical system and the projecting optical system and the total reflection prism two-dimensionally on the same plane. The invention has been carried out in consideration of the above-described problem

SUMMARY OF THE INVENTION

It is an object to provide a projecting display apparatus capable of arranging an illuminating optical system and a projecting optical system such that optical axes thereof become perpendicular to each other without producing an unreasonable arrangement of a total reflection prism.

In order to achieve the above-described object, the invention is characterized in a projecting display apparatus comprising an illuminating optical system for converting light from a light source into illuminating light, an image display panel for modulating the illuminating light to image light, a total reflection prism for guiding the incident illuminating light to the image display panel and having a reflecting face for totally reflecting the image light, and a projecting optical system for focusing the image light emitted from the total reflection prism to a screen, wherein the illuminating optical system and the projecting optical system are provided such that directions of optical axes thereof constitute a right angle, a first reflecting member for guiding the illuminating light to the total reflection prism by bending a progressing path of the illuminating light emitted from the illuminating optical system is provided between the illuminating optical system and the total reflection prism, and the image display panel is provided to be inclined by a predetermined angle to an optical system reference face in parallel with the respective optical axes of the illuminating optical system and the projecting optical system and is arranged in a state of being rotated centering on a normal direction thereof in accordance with the inclination angle.

According to the projecting display apparatus described above, the total reflection prism is provided such that the image light does not transmit through the air gap and therefore, fineness of parallelism of the two prisms can comparatively be lowered and time and labor required for designing and fabricating the total reflection prism can be alleviated. Further, the projecting optical system and the illuminating optical system can be provided such that directions of the optical axes thereof are perpendicular to each other. A circuit board for driving the image display panel is not projected significantly in a predetermined direction and large-sized formation of the projector engine can be prevented. An inclination of an image by inclining the image display panel can be corrected by arranging the image display panel in a state of being rotated in the normal direction of the screen and the image having a correct direction can be projected.

Further, the invention is preferably characterized in that the image display panel is inclined to the optical system reference face by 45 degrees.

According to the projecting apparatus described above, the circuit board can be inclined by 45 degrees and deviated projection of the circuit board can be restrained to minimize.

Further, the invention is preferably characterized in that the optical axis of the illuminating optical system is in parallel with the screen.

According to the projecting apparatus described above, by making the optical axis of the illuminating optical system in parallel with the screen, when the projecting optical system is rotated centering on the optical axis of the illuminating optical system, a direction of emitting the image light can be changed without changing an attitude of installing the light source, a projecting distance can pertinently be changed by providing a plurality of sheets of mirrors at outside of the projector engine and therefore, even in a projecting apparatus using a light source an installing attitude of which is restricted to a horizontal direction or a vertical direction, for example, a rear projection display using the same projector engine and having a different size of the screen can easily be designed and common formation of the projector engine can be achieved.

Further, the invention is preferably characterized in that the projecting optical system includes a second reflecting member for bending a progressing path of the image light, a first lens system provided on a side of the image display panel and having an optical axis in a direction perpendicular to the optical axis of the illuminating optical system, and a second lens system provided on a side of the screen of the second reflecting member.

According to the projector apparatus described above, the direction of emitting the image light can be changed by changing an angle of the second reflecting member, a rear projection display using the same projector engine and having a different screen size or the like can easily be designed and therefore, common formation of the projector engine can be achieved.

The invention is preferably characterized in that an optical axis of the first lens system and the optical axis of the second lens system are disposed in a plane perpendicular to the optical axis of the illuminating optical system.

According to the projecting display apparatus described above, the direction of emitting the image light can be changed by inclining the projector engine while maintaining the optical axis of the optical illuminating system in parallel with the screen and common formation of the projector engine can be achieved for a rear projection display having a different specification.

The invention is preferably characterized in that the first reflecting member and the second reflecting member are plane mirrors.

According to the projecting display apparatus described above, by using the inexpensive plane mirrors as the first and the second reflecting members, fabrication cost can be restrained than in using a prism.

The invention is preferably characterized in that the image display panel is a digital micromirror device.

According to the projecting display apparatus described above, by using the digital micromirror device for the image display panel, the best mode mostly achieving the effect of the invention can be realized.

Figure 1:
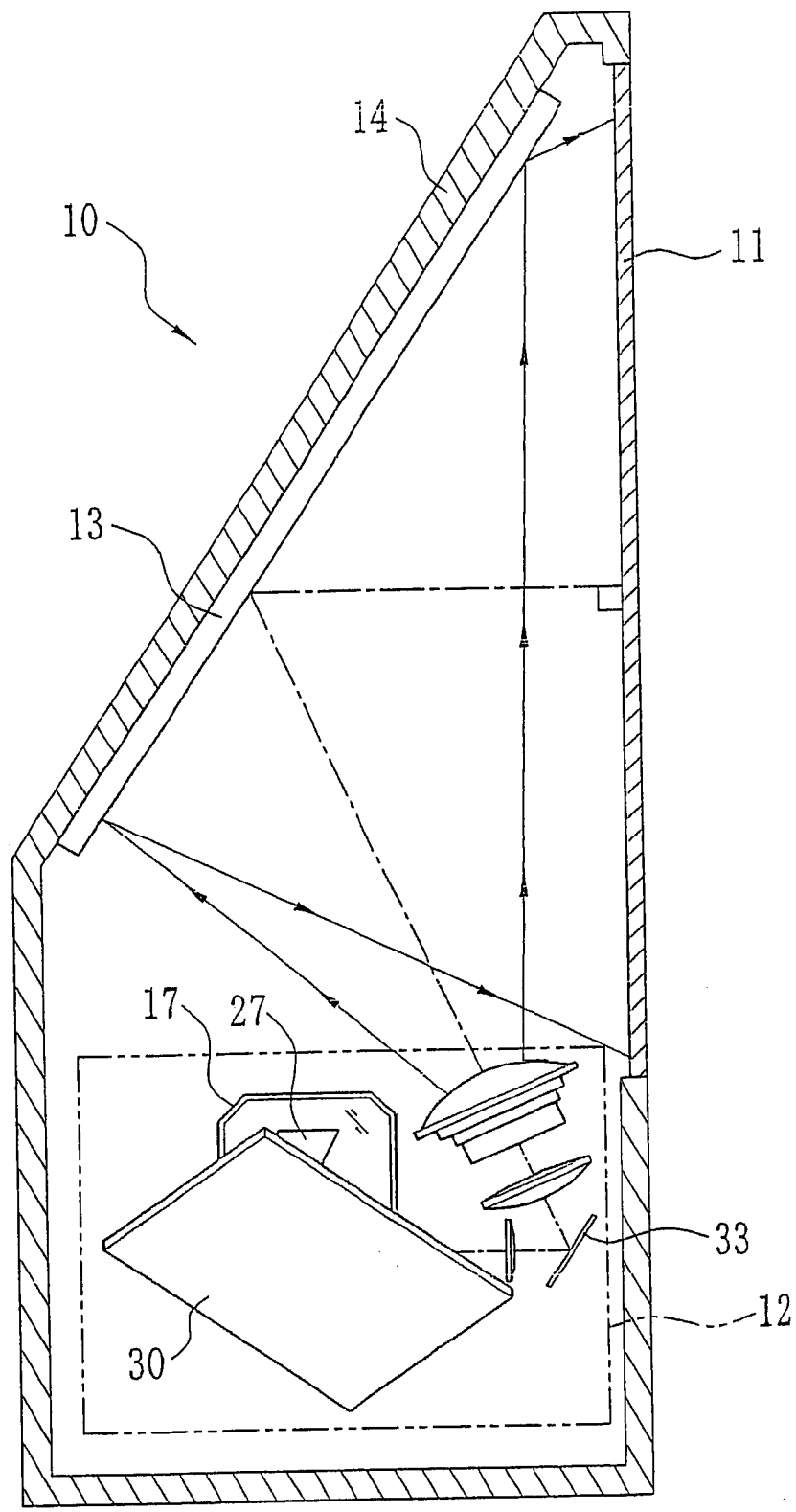
FIG. 1 is a sectional view of one embodiment of a rear projection display.

Reference numerals are used to identify various elements in the drawings including the following:

| 10  | rear projection display       |
|-----|-------------------------------|
| 11  | screen                        |
| 19  | illuminating optical system   |
| 19a | optical axis                  |
| 20  | total reflection prism        |
| 21  | DMD                           |
| 21a | screen                        |
| 22  | projecting optical system     |
| 27  | first mirror                  |
| 30  | circuit board                 |
| 33  | second mirror                 |
| 34  | first lens system             |
| 34a | optical axis                  |
| 35  | second lens system            |
| 35a | optical axis                  |
| 40  | air gap                       |
| P1  | optical system reference face |
| N1  | normal line                   |

DETAILED DESCRIPTION OF THE INVENTION

Figure 2:
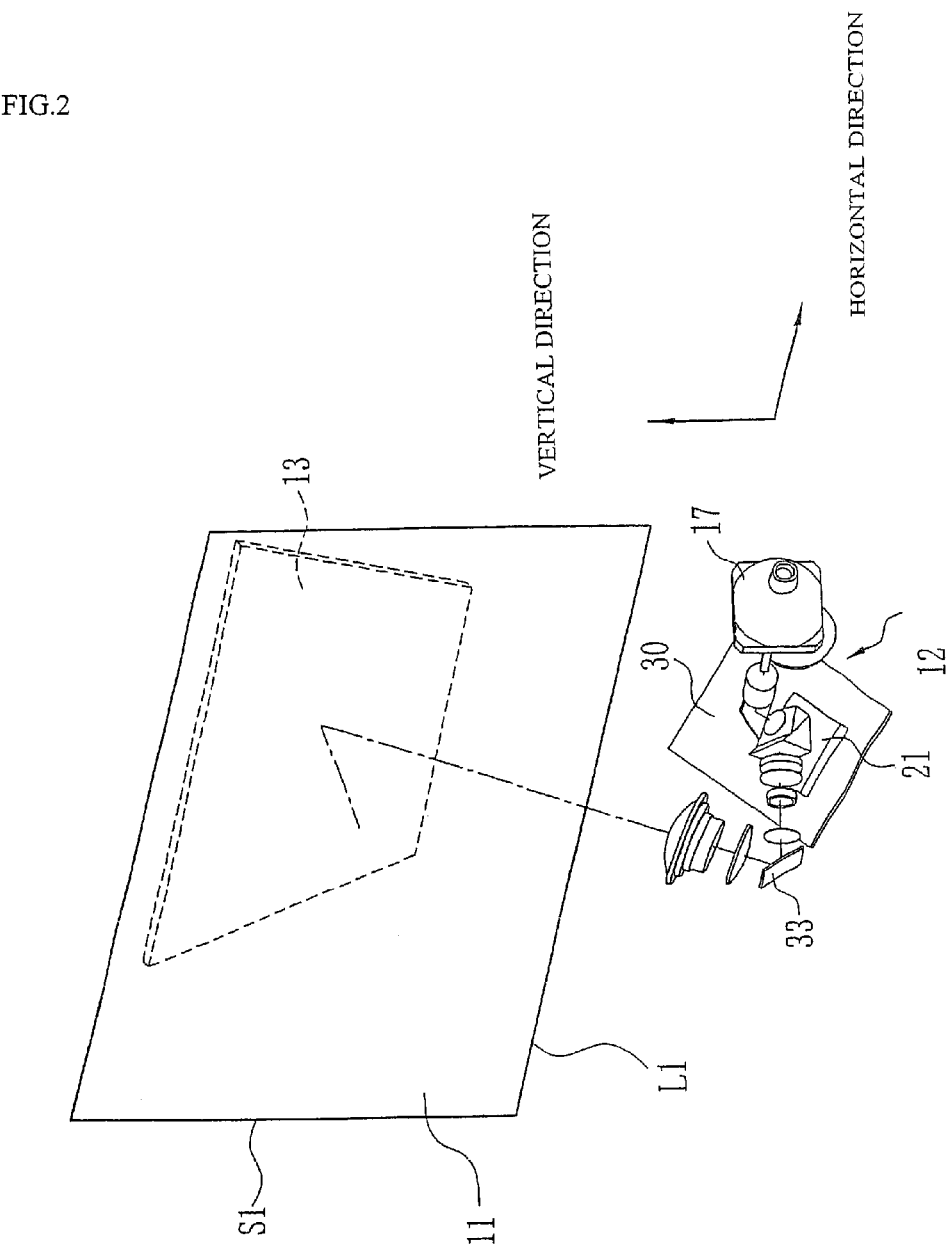
FIG. 2 is a perspective view showing an outline of the embodiment of the rear projection display.

In FIG. 1, a rear projection display 10 is provided with a screen 11 of a transmitting type to which an image is projected, a projector engine 12 for emitting image light, and a plane mirror 13 for reflecting image light to the screen 11. The projector engine 12 and the plane mirror 13 are provided at inside of a cabinet 14, and the screen 11 is provided at an opening portion of the cabinet 14. In FIG. 2, the screen 11 is a rectangle having a long side L1 in a horizontal direction and a short side S1 in a vertical direction. An image is projected to the screen 11 from a rear side thereof and the projected image is enjoyed from a front side of the screen 11. The plane mirror 13 is constituted by a trapezoidal shape having a long upper side and a short lower side and is inclined to the screen 11, and a center of image light emitted from a lower side face of the plane mirror 13 is perpendicular to the screen 11.

Figure 3:
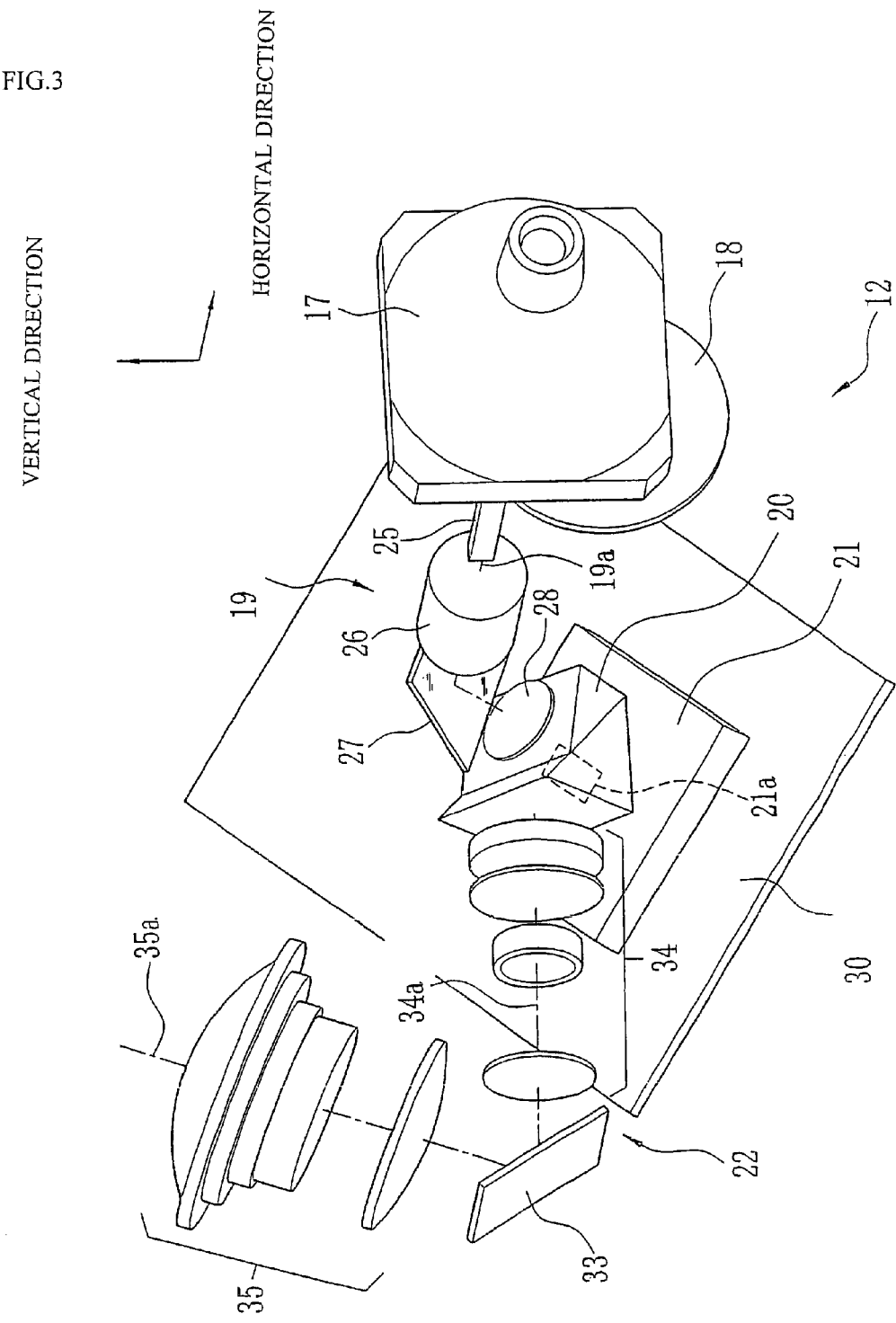
FIG. 3 is a perspective view showing a constitution of one embodiment of a projection engine.

In FIG. 3, the projector engine 12 is provided with a light source apparatus 17, a color wheel 18, an illuminating optical system 19, a total reflection prism 20, DMD 21, and a projecting optical system 22. The light source apparatus 17 is provided with a light source for radiating a white light having a high brightness and emits white light radiated from the light source to the illuminating optical system 19. The color wheel 18 is provided between the light source apparatus 17 and the illuminating optical system 19. The color wheel 18 includes three color filters for respectively transmitting red color light (R light), green color light (G light), blue color light (B light) on a circular disk constituting a base plate and the respective color filters are arranged at predetermined intervals in a circumferential direction. When the color wheel 18 is rotated, white light radiated from the light source apparatus 17 is separated to three primary colors of R, G, B in a time sharing style and is incident on the illuminating optical system 19.

The illuminating optical system 19 is provided with a rod integrator 25 and a relay lens system 26. The rod integrator 25 comprises glass formed in a quadrangular prism. Pieces of light transmitted through the color wheel 18 are incident on the rod integrator 25 and superposed by being totally reflected at inside thereof and converted into illuminating light removing a nonuniformity in brightness. A first mirror 27 in a planar shape is provided between the illuminating optical system 19 and the total reflection prism 20. The first mirror 27 bends a light path of illuminating light emitted from the rod integrator 25 and the relay lens system 26 to reflect illuminating light to the total reflection prism 20. A lens 28 is provided at a face of the total reflection prism 20 on which illuminating light is incident and converges illuminating light to efficiently illuminate DMD 21.

Illuminating light incident on the total reflection prism 20 transmits through the total reflection prism 20 to reach DMD 21. DMD 21 is provided with a display 21a and as is well known, the display 21a is aligned with a number of micromirrors in a matrix shape. Inclination of each micromirror is switched to ON position and OFF position, light (ON light) incident on the micromirror at the ON position is reflected to the projecting optical system 22 and light (OFF light) incident on the micromirror at the OFF position is reflected to outside of the projecting optical system 22. DMD 21 reproduces one pixel of the image by ON light reflected by one micromirror.

DMD 21 is provided on a circuit board 30 formed with a control circuit for controlling to drive the respective micromirrors. The display 21a of DMD 21 aligned with the micromirrors and a board face of the circuit board 30 are in parallel with each other. When a control signal is inputted from the circuit board 30 to DMD 21, a number of micromirrors modulate illuminating light for respective pixels to generate image light. Image light is emitted from DMD 21 and is incident on the total reflection prism 20. Image light is totally reflected at inside of the total reflection prism 20 and a light path thereof is bended substantially in right angle. Image light is emitted from the total reflection prism 20 to the projecting optical system 22.

The projecting optical system 22 comprises a second mirror 33 in a planar shape, a second lens system 35 provided on a side of the screen 11 of the second mirror 33, and a first lens system 34 provided on a side of DMD 21 of the second mirror 33. The projecting optical system 22 focuses image light emitted from the total reflection prism 20 and projects to enlarge the image on the screen 11. The first lens system 34 and the second lens system 35 are respectively provided with optical axes 34a, 35a. The optical axis 34a is perpendicular to the screen 11 and the optical axis 34a and the optical axis 35a are disposed on the same plane perpendicular to an optical axis 19a of the illuminating optical system 19.

Figure 4:
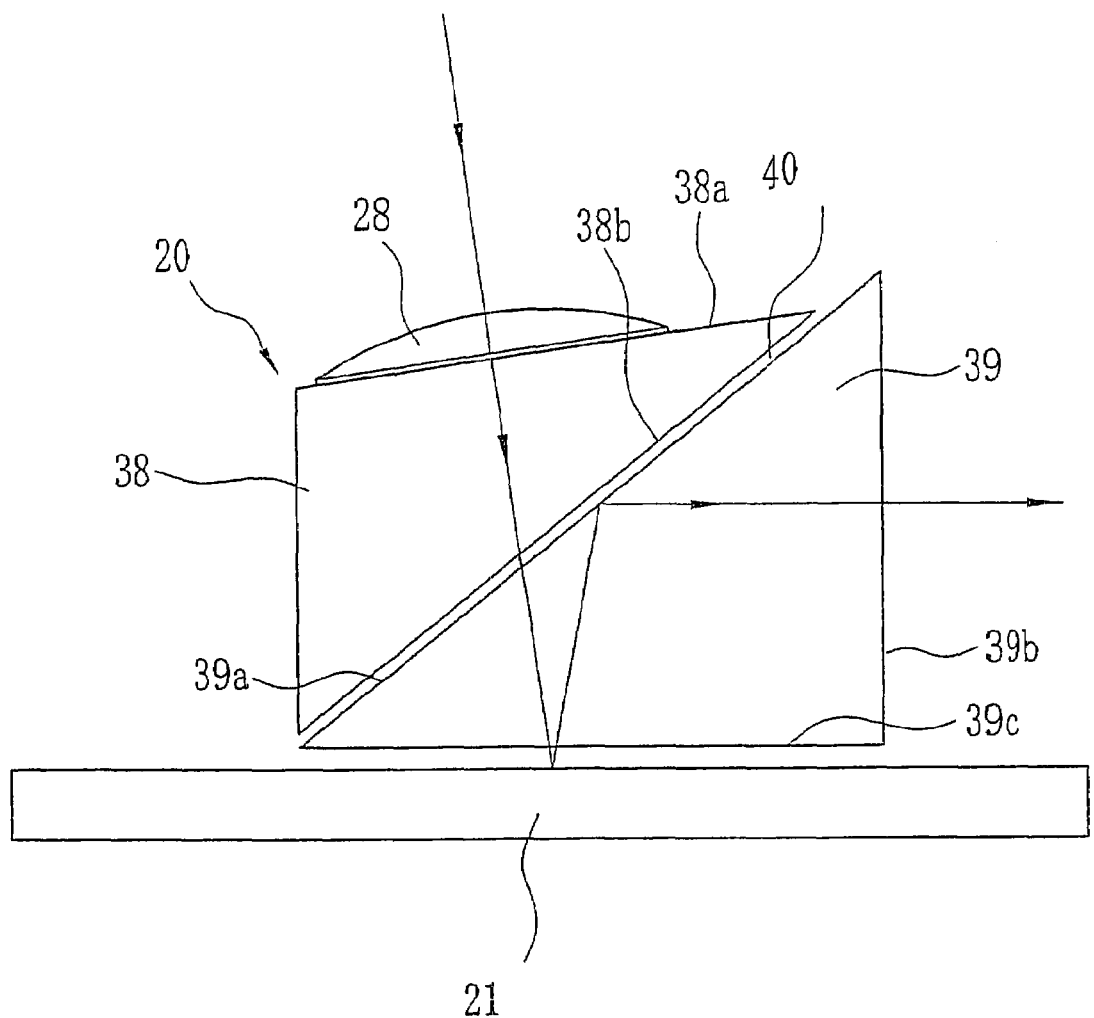
FIG. 4 is a plane view of one embodiment of a total reflection prism.

In FIG. 4, the total reflection prism 20 is constituted by two triangular prisms of a first prism 38 and a second prism 39. The first prism 38 is provided with an illuminating light incident face 38a on which illuminating light reflected by the first mirror 27 is incident, and an illuminating light emitting face 38b for emitting illuminating light incident on the first prism 38. The second prism 39 is provided with a reflecting face 39a on which illuminating light transmitted through the first prism 38 is incident and which totally reflects image light reflected by DMD 21 at an inner face thereof, an image light emitting face 39b for emitting image light totally reflected by the reflecting face 39a from the second prism 39, and a light transmitting face 39c regularly opposed to DMD 21 in parallel therewith for transmitting illuminating light and image light. The first prism 38 and the second prism 39 are arranged such that the illuminating light emitting face 38b and the total reflection face 39a are in parallel with each other via an air gap 40.

Figure 5:
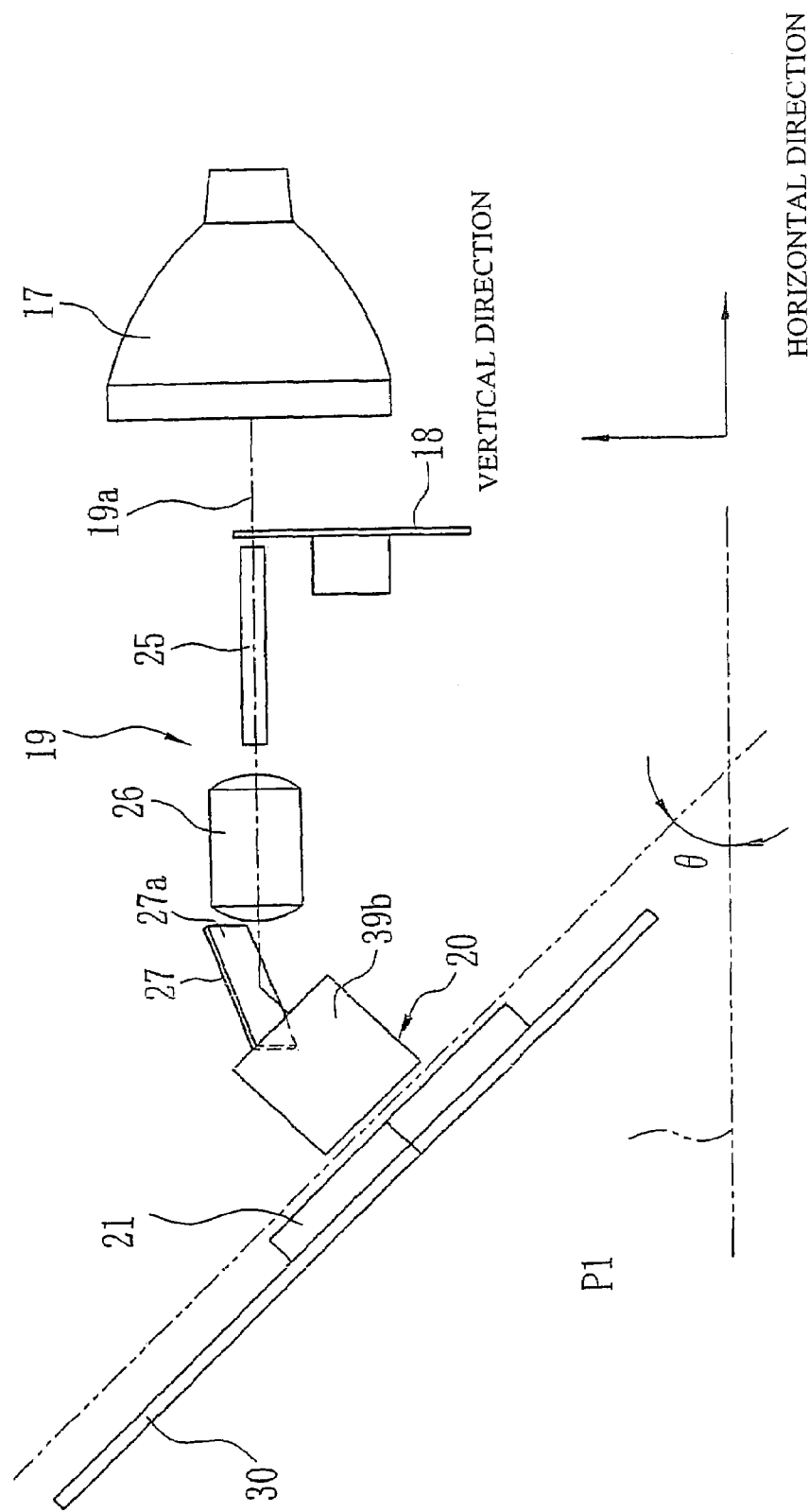
FIG. 5 is a front view showing one embodiment of an illuminating optical system and DMD.

In FIG. 5, the optical axis 19a of the illuminating optical system 19 is in parallel with a horizontal direction of the screen 11. The illuminating optical system 19 and the first lens system 34 of the projecting optical system 22 are provided such that the respective optical axes 19a and 34a are in parallel with an optical system reference face P1. The optical system reference face P1 is a horizontal face. The total reflection prism 20, DMD 21, and the circuit board 30 are provided to be inclined to the optical system reference face P1 by an angle indicated by notation θ in the drawing. θ is 45 degrees. The total reflection prism 20 is disposed at a position more proximate to the screen 11 than the optical axis 19a and the first mirror 27 is inclined such that a reflecting face 27a thereof is directed to the screen 11. The first mirror 27 folds a light path of illuminating light relative to the optical axis 19a and makes illuminating light incident perpendicularly on the illuminating light incident face 38a of the total reflection prism 20.

Figure 6:
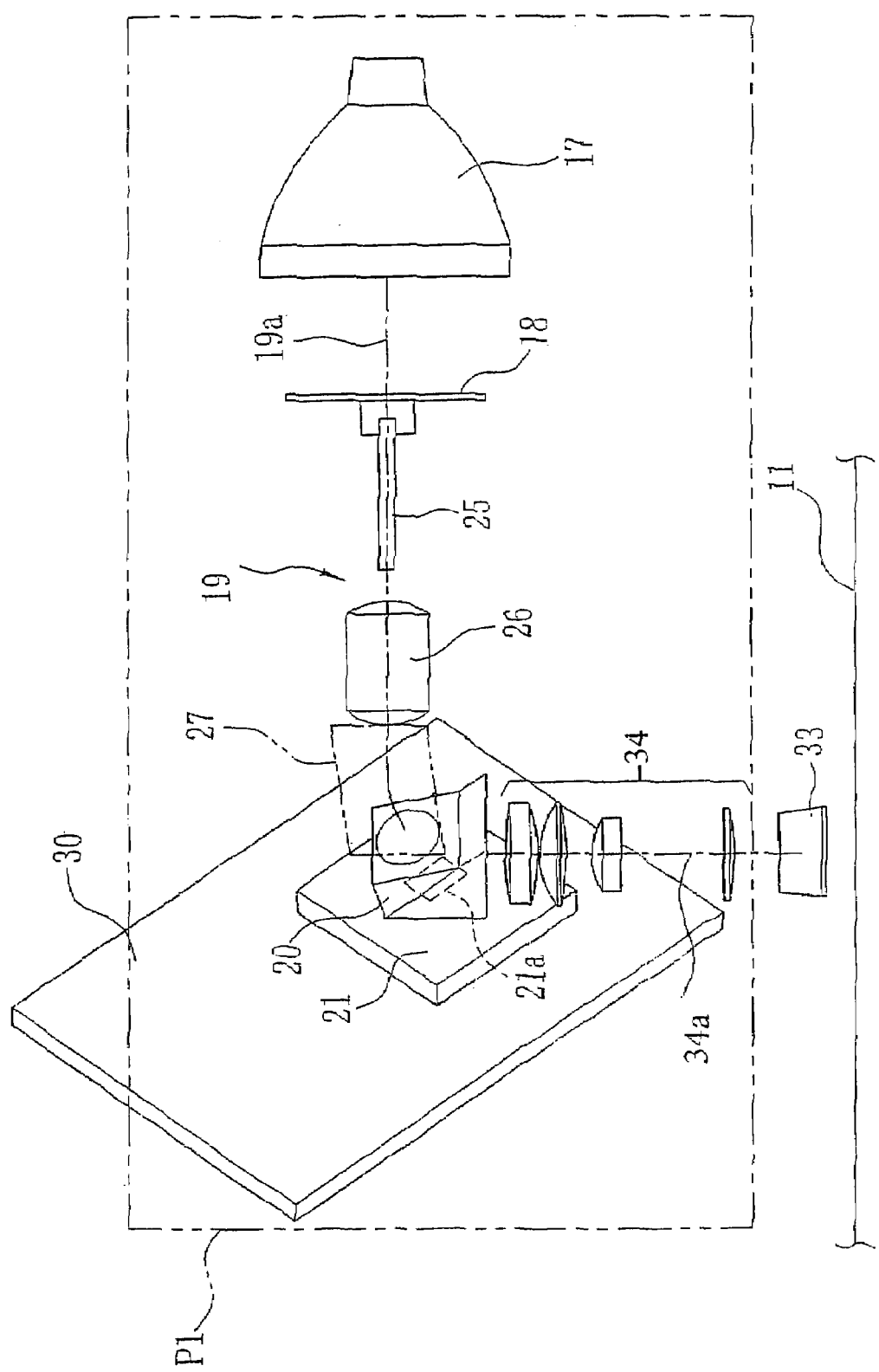
FIG. 6 is a top view showing one embodiment of the illuminating optical system and a projecting optical system.

In FIG. 6, the optical axis 19a of the illuminating optical system 19 is perpendicular to the optical axis 34a of the first lens system 34 of the projecting optical system 22. The optical axis 34a of the first lens system 34 is perpendicular to the image light emitting face 39b of the total reflection prism 20.

Figure 7A:
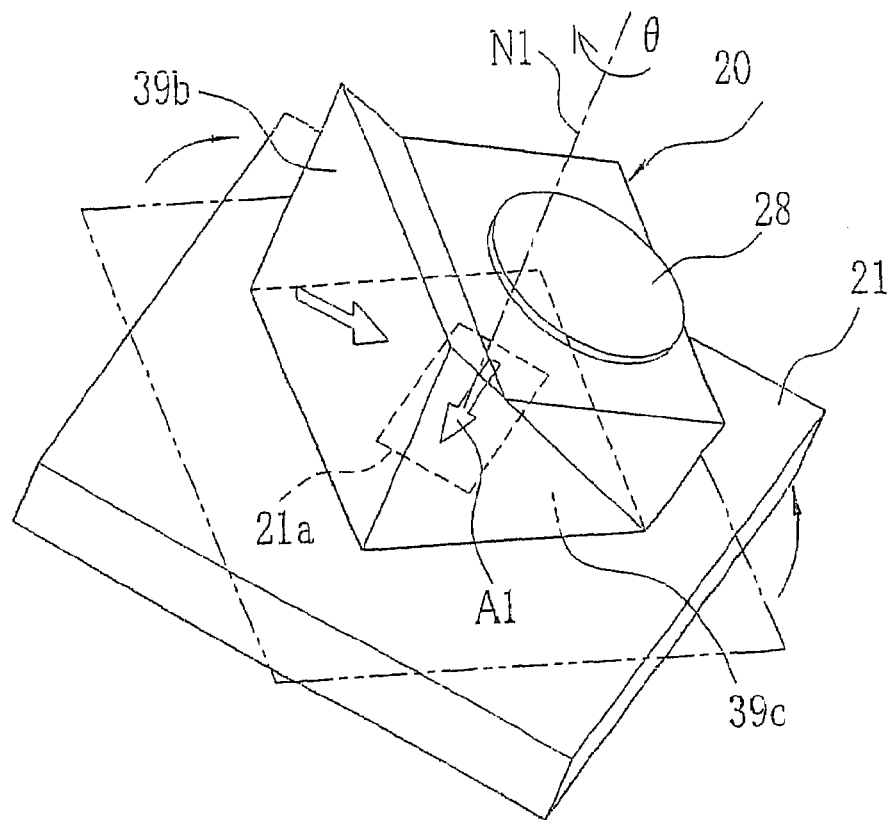
FIGS. 7A and 7B illustrate explanatory views showing positional relationships between DMD and the total reflection prism.
Figure 7B:
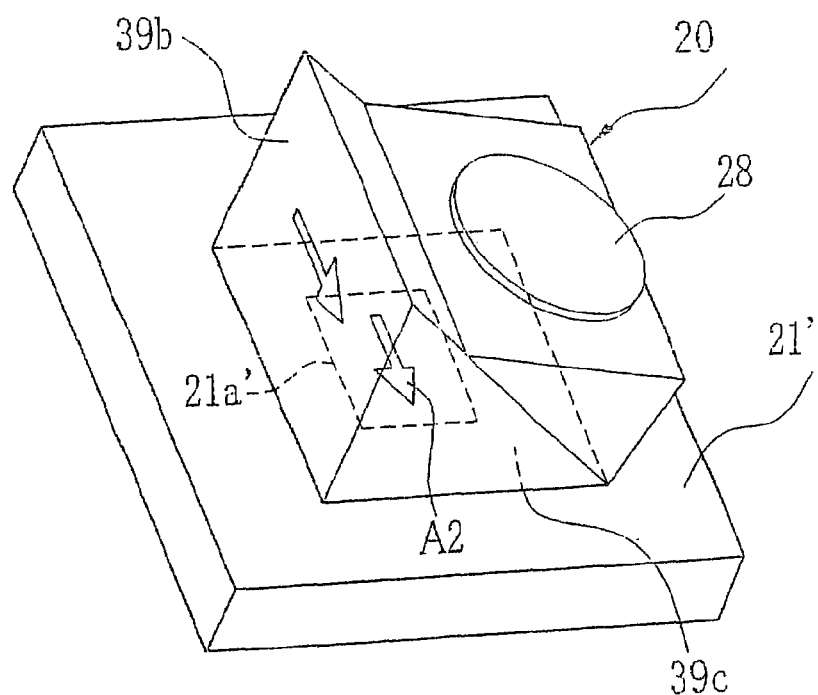

In FIG. 7A, DMD 21 is arranged in a state of being rotated centering on a normal line N1 of a display 21a by an angle the same as the angle θ inclined to the optical system reference face P1. Although DMD 21' shown in FIG. 7B is the same as DMD 21 shown in FIG. 7A, one side of a display 21a' and a bottom face of the total reflection prism 20 are in parallel with each other. DMD 21 shown in FIG. 7A is arranged in a state of being rotated by an angle θ centering on the normal line N1 relative DMD 21' and four sides of the display 21a are not in parallel with four sides of the light transmitting face 39c.

When the total reflection prism 20 is arranged such that the four sides of the display 21a' and the four sides of the light transmitting face 39c are respectively in parallel with each other as in DMD 21', for example, an arrow mark image A2 directed in a direction of a long side of the display 21a' is reflected by the total reflection face 39a and is directed in a direction in parallel with the display 21a' on the image light emitting face 39b. Then, when the arrow mark image A2 is projected to the screen 11, since DMD 21' and the total reflection prism 20 are inclined to the optical reference face P1, the arrow mark image A2 to be directed in the horizontal direction of the screen 11 becomes an image rotated by the angle θ.

Since DMD 21 is rotated by the angle θ in the direction of the normal line N1 of the display 21a in contrast to DMD 21', an arrow mark image A1 a front end of which is directed in a direction of a long side of the display 21a is rotated by θ relative to the display 21a on the image light emitting face 39b when reflected by the total reflection face 39a and is directed in a direction of a diagonal line of the image light emitting face 39b in a shape of a rectangle. Thereby, when the arrow mark image A1 is projected to the screen, the arrow mark image A1 is projected thereto in a correct direction in which the front end of the arrow mark is directed in the horizontal direction of the screen 11.

Further, the invention is not limited to the constitution in which the total reflection prism 20, DMD 21 and the circuit board 30 are inclined by 45 degrees to the optical system reference face P1 constituting the reference of the illuminating optical system 19 and the projecting optical system 22 as in the embodiment but the inclination angle can be changed more or less within a range by which the illuminating optical system 19 and the projecting optical system 22 can be made to be perpendicular to each other and illuminating light can perpendicularly be incident on the illuminating light incident face 38a of the total reflection prism 20. Further, although only a single sheet of the first mirror 17 is arranged between the illuminating optical system 19 and the total reflection prism 20, a plurality of sheets of mirrors may be provided to change a direction of illuminating light source light by the light source apparatus 17 by 180 degrees. Respective optical elements constituting the illuminating optical system and the projecting optical system are not limited to those of the above-described embodiment but can pertinently be changed. Further, the invention is not limited to the projecting display apparatus of the rear system for projecting the image from the rear side of the screen but may be applied to a projecting display apparatus of a front system for projecting an image from a front side of a screen.

What is claimed is:

1. A projecting display apparatus comprising:
    an illuminating optical system that converts light from a light source into illuminating light,
    an image display panel comprising a display surface that modulates the illuminating light to image light,
    a total reflection prism that guides the illuminating light incident thereon to the image display panel, the total reflection prism having a reflecting face that totally reflects the image light and a light emitting face that transmits the illuminating light and the image light;
    a first reflecting member that guides the illuminating light to the total reflection prism by bending a progressing path of the illuminating light emitted from the illuminating optical system, the first reflecting member being disposed between the illuminating optical system and the total reflection prism; and
    a projecting optical system that focuses the image light emitted from the total reflection prism to a screen, an optical axis of the projecting optical system having a direction perpendicular to an optical axis of the illuminating optical system,
    wherein the image display panel is provided to be (1) inclined to a first angle measured from a reference surface of the display surface relative to an optical system reference plane, said plane being parallel to the respective optical axes of the illuminating optical system and the projecting optical system, and (2) rotated about a central axis normal to the display surface of the image display panel such that a reference side of the display surface extends at a second angle to a reference side of the light transmitting face, and (3) the second angle is equal to the first angle.

2. The projecting display apparatus according to claim 1, wherein said first angle is 45 degrees.

3. The projecting display apparatus according to claim 1, wherein the optical axis of the illuminating optical system is in parallel with the screen.

4. The projecting display apparatus according to claim 1, which comprises:
    a second reflecting member that bends a progressing path of the image light,
    a first lens system provided on a side of the image display panel and having an optical axis in a direction perpendicular to the optical axis of the illuminating optical system, and
    a second lens system provided between the screen and the second reflecting member.

5. The projecting display apparatus according to claim 4, wherein the optical axis of the first lens system and an optical axis of the second lens system are disposed in a plane perpendicular to the optical axis of the illuminating optical system.

6. The projecting display apparatus according to claim 4, wherein the first reflecting member and the second reflecting member are plane mirrors.

7. The projecting display apparatus according to claim 1, wherein the image display panel is a digital micromirror device.

8. A projecting display apparatus comprising:
    an illuminating optical system that converts light from a light source into illuminating light;
    an image display panel comprising a display surface that modulates the illuminating light from the illuminating optical system into image light;
    a total reflection prism arranged intermediate the illuminating optical system and image display panel to receive the illuminating light from the illuminating optical system and to receive the image light from the display surface,
    the total reflection prism guiding the received illuminating light to the display surface of the image display panel, the total reflection prism having a reflecting face that totally reflects the image light received from the display surface and a light emitting face that transmits the illuminating light and the image light;
    a first reflecting member that guides the illuminating light to the total reflection prism by bending a progressing path of the illuminating light emitted from the illuminating optical system, the first reflecting member disposed between the illuminating optical system and the total reflection prism; and
    a projecting optical system that focuses, for projection, the image light transmitted from the total reflection prism, an optical axis of the projecting optical system having a direction perpendicular to an optical axis of the illuminating optical system,
    wherein the image display panel is (1) inclined at a first angle measured from a reference surface of the display surface relative to an optical system reference plane, said plane being parallel to the respective optical axes of the illuminating optical system and the projecting optical system, and (2) rotated about a central axis normal to the display surface of the image display panel such that a reference side of the display surface extends at a second angle to a reference side of the light transmitting face, the second angle being equal to the first angle.

9. A projecting display apparatus comprising:

an illuminating optical system (19) that emits an illuminating light;

a total reflection prism (20) positioned to receive the illuminating light incident thereon and transmitting the illuminating light through a light transmitting face (39*c*);

a first mirror (27), located between the illuminating optical system and the total reflection prism, to reflect a light path of the illuminating light received from the illuminating optical system to the total reflection prism 20;

a digital micromirror device (21), the digital micromirror device 21 comprising a display (21*a*) having plural micromirrors arranged in a matrix shape, the mirrors reflecting illuminating light received from the light transmitting face (39*c*) back to the light transmitting face as image light, the image light thereafter reflecting off a reflecting face (39*a*) of the total reflection prism to exit the total reflection prism through a image light emitting face (39*b*); and a projecting optical system (22) arranged to receive the image light emitted from the image light emitting face and focus the received image light for projection, wherein, the image display panel is i) inclined at a first angle measured from a reference surface of the display relative to an optical system reference plane, said plane being parallel to the respective optical axes of the illuminating optical system and the projecting optical system, and ii) positioned about a central axis normal to the display of the image display panel with a reference side of the display surface extending at a second angle with respect to a reference side of the light transmitting face, the second angle is equal to the first angle.

* * * * *

UNITED STATES PATENT AND TRADEMARK OFFICE
CERTIFICATE OF CORRECTION

PATENT NO. : 7,322,702 B2  Page 1 of 1
APPLICATION NO. : 11/145929
DATED : January 29, 2008
INVENTOR(S) : Hitoshi Shimizu It is certified that error appears in the above-identified patent and that said Letters Patent is hereby corrected as shown below:

On the title page, insert Item (30), as follows:

--(30)  Foreign Application Priority Data

June 7, 2004   (JP) …………………..2004-168078.--

Signed and Sealed this

Twenty-seventh Day of May, 2008

JON W. DUDAS
*Director of the United States Patent and Trademark Office*